Figure 1:
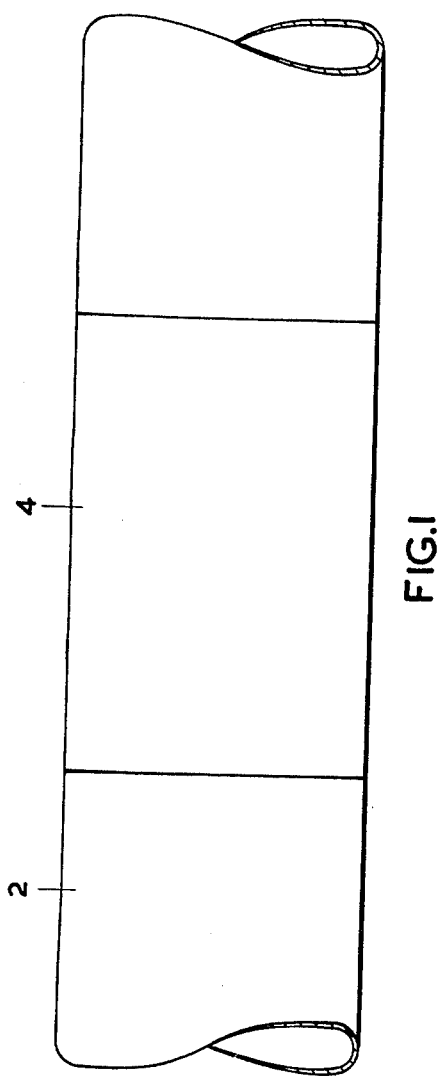

United States Patent [19]

Smith et al.

[11] 4,098,451
[45] Jul. 4, 1978

[54] WELDING METHOD

[75] Inventors: Christopher John Smith, Maidenhead; David John Lythall, Hertford, both of England

[73] Assignee: BOC Limited, London, England

[21] Appl. No.: 791,874

[22] Filed: Apr. 28, 1977

[30] Foreign Application Priority Data

Apr. 30, 1976 [GB] United Kingdom ............... 17849/76

[51] Int. Cl.² ............................................. B23K 31/06
[52] U.S. Cl. .................................... 228/119; 228/178; 228/219; 285/31; 285/166; 285/184; 285/286
[58] Field of Search ....................... 228/119, 219, 178; 285/31, 165, 166, 184, 286

[56] References Cited

U.S. PATENT DOCUMENTS

| | | | |
|---|---|---|---|
| 1,838,249 | 12/1931 | Brown | 285/286 X |
| 2,955,850 | 10/1960 | Bellinger | 285/166 X |
| 3,433,504 | 3/1969 | Hanes | 285/166 X |
| 3,876,852 | 4/1975 | Topham | 228/219 |

*Primary Examiner*—Al Lawrence Smith
*Assistant Examiner*—K. J. Ramsey
*Attorney, Agent, or Firm*—Dennison, Dennison, Meserole & Pollack

[57] ABSTRACT

A method of repairing an under water pipeline from which a defective or damaged length of pipe has been cut away to form longitudinally spaced-apart, exposed, pipe ends which method includes the steps of:

(a) butt-welding to each exposed pipe end a tubular end portion of a hollow, open-ended member having an inner or outer part-spherical mating surface;

(b) butt-welding a sleeve to one end of a length of replacement pipe;

(c) mounting on the sleeve a tubular end portion of a hollow open-ended member which has a part-spherical mating surface complementary to that of one of the open-ended members butt-welded to the exposed pipe ends and which is adapted to form therewith a ball-and-socket coupling;

(d) welding to the other end of the replacement pipe a tubular end portion of a hollow open-ended member which has a part-spherical mating surface complementary to that of the other of the members butt-welded to the exposed pipe ends and which is adapted to form therewith a ball-and-socket coupling;

(e) positioning the replacement pipe between the exposed pipe ends and mating the respective pairs of open-ended members; and (f) fillet welding the sleeve to the tubular end portion of the open-ended member mounted thereupon and fillet welding the mating open-ended members to each other.

8 Claims, 6 Drawing Figures

WELDING METHOD

This invention relates to a method of welding. In particular it relates to a method of repairing a pipeline situated under water, in which method a damaged or sub-standard section of the pipeline is cut away and replaced with a new length of pipe.

One known method of repairing a pipeline situated under water involves the use of welded ball-and-socket joints to connect the ends of a length of replacement pipe to the exposed ends of the pipeline that are formed when the defective section of the pipeline has been cut away. One important advantage of this method is that the ball-and-socket joints are able to cater for axial misalignment of the exposed ends of the pipeline.

The cuts in the existing pipeline may be made and then inflatable 'pigs' or stops may be inserted within the exposed ends of the pipeline and inflated so as to engage the inner wall of the pipeline and thereby prevent the ingress of water into the pipeline. The exposed ends are cleaned and prepared for welding and socket members are slid onto each end. Above water a suitable length of replacement pipe may be cut from a spool, inflatable pigs inserted in the ends of the replacement pipe and then inflated, and tubular ball members welded to the ends of the replacement pipe. This length of replacement pipe is then lowered under water. The two ball-and-socket joints are then welded by a GMA Welding method after assembling the replacement pipe and end members.

In this method, the replacement pipe is clamped in position with its end members engaging the end members mounted on the ends of the pipeline. The welds are made in a welding chamber which is mounted on the assembly of pipes before the replacement pipe is clamped in position. The welding chamber is intended to be operated with a gaseous 'atmosphere' inside it. In order to make seals to maintain the gaseous atmosphere, cuffs or like sealing members are clamped around the parts of the pipe assembly entering the chamber and the flanges (usually tubular) of the chamber through which the pipes enter the chamber. The cuffs (or boots as they are sometimes called) may be made of elastomeric material. If desired they may each be formed with a slit running from end-to-end of one of their sides.

It is known to make all the welds fillet (or lap) welds. This is satisfactory for welding together the members that form a ball-and-socket joint as the outer mating surface of the socket member. However, it is not possible always to have a reliably close fit between the inner surface of the tubular non-mating end of a ball-or-socket member and the pipe to which it is to be welded. This is because the external diameter of the pipe will typically have a tolerance of plus or minus one percent. Unless either the ball and socket members are to be fabricated (generally by casting) or they are to be machined to the precise dimensions only after the exact external diameters of the pipes to which they are to be welded are determined it will be necessary to assume that the external diameter of each respective end of the pipeline could be one percent greater than that nominally specified for it. It can be appreciated that if in fact the external diameter of the pipeline is one percent less than that specified for it there will be a considerable radial gap between the pipe and the tubular non-mating ends of the socket members. In consequence, the fillet weld therebetween will be relatively weak, particularly, if a large diameter pipeline (e.g. 3 ft in external diameter) is to be repaired.

According to the present invention there is provided a method of repairing an under water pipeline from which a defective or damaged length of pipe has been cut away to form two longitudinally spaced-apart, exposed, pipe ends, which method includes the steps of:

(a) butt-welding to each exposed end a tubular end portion of a hollow, open-ended member having an inner or outer part-spherical mating surface;

(b) butt-welding a sleeve to one end of a replacement pipe;

(c) mounting on the sleeve a tubular end portion of a hollow open-ended member which has a part-spherical mating surface complementary to that of one of the open-ended members butt-welded to the exposed pipe ends and which is adapted to form therewith a ball-and-socket coupling;

(d) welding to the other end of the replacement pipe a tubular end portion of a hollow open-ended member which has a part spherical mating surface complementary to that of the other of the open-ended members butt-welded to the exposed pipe ends and which is adapted to form therewith a ball-and-socket coupling;

(e) positioning the replacement pipe between the exposed pipe ends and mating the respective pairs of open-ended-members; and (f) fillet welding the sleeve to the tubular end portion of the open-ended member mounted thereupon and fillet welding the mating open-ended members to each other;

wherein the sleeve and the tubular end portions of the open-ended members to be butt welded have a radial wall thickness and internal diameter so as to be capable of being butt-welded to the end of the pipe or pipeline (as the case may be) to be joined thereto irrespective of where in the range of external diameters specified for the pipe and pipeline the external diameters of the pipe and pipeline lie.

There are two possible ways of performing step (d). The preferred way is to butt-weld the tubular end portion of the other end of the replacement pipe. However, it is also possible to butt-weld a sleeve to the other end of the replacement pipe and then fillet-weld the tubular end portion to the sleeve. If the latter alternative is performed it will be possible to fillet-weld both sleeves to the tubular end portions of the respective open-ended members mounted thereupon after positioning the replacement pipe between the exposed pipe ends. However, it is not preferred to employ two sleeves as this involves making an extra weld that is a fillet weld.

The method according to the present invention offers the advantage that some of the welds made in repairing the pipeline are butt welds (which are usually stronger than comparable fillet welds), while those fillet welds that need to be made are between components that may be precisely fabricated such that the radial gap between components to be fillet-welded together need to be no more than is necessary for the components to be fitted together before being welded. In consequence, it is possible to avoid depositing fillet welds which are relatively weak in consequence of their being formed between parts that are separated by a relatively large radial distance.

When, as preferred, just one sleeve is employed the open-ended members to be welded to the exposed ends of the pipeline may conveniently have respectively internal and external part-spherical mating surfaces. However, both open-ended members to be welded to the exposed ends of the pipeline can have external mating surfaces or both can have internal mating surfaces. In the instance mentioned in the first sentence of this paragraph the open-ended member to be welded to the sleeve may have an internal or external part-spherical mating surface, though it is generally more convenient for its mating surface to be external. On the other hand, if two sleeves are used it may be convenient that both the open-ended members to be butt-welded to the exposed ends of the pipelines should have internal mating surfaces, although, if desired, one open-ended member may have an internal mating surface, and the other an external mating surface.

If desired, a sealing ring may be engaged between the mating surfaces of each pair of engaging open-ended members.

One convenient procedure for repairing a pipeline in accordance with the present invention is to cut away the defective or damaged length, prepare the exposed ends of the pipeline ready for welding, and butt-weld the open-ended members to the exposed ends. Above the surface of the water on a barge or other support vessel or platform, a chosen length of replacement pipe is cut from a spool of pipe, the sleeve (or sleeves) is welded to the replacement pipe and an open-ended member is welded to one end of the replacement pipe, another open-ended member being slidably mounted on the sleeve at the other end. This assembly is then lowered underwater with the sliding open-ended member in a position such that the replacement pipe is able to be fitted between the exposed ends of the pipeline. At the end of the replacement pipe opposite the sliding open-ended member the welded open-ended member is mated with the adjacent complementary open-ended member welded to one of the exposed ends of the pipe to form a ball-and-socket coupling. The ball and socket coupling is then clamped readying for welding. The pair of open-ended members at the other end are then mated to form a ball-and-socket coupling. The fillet welds can then be made.

Preferably each fillet weld is made in a gaseous environment which is specially created under water in a chamber which is situated so as to create around the respective parts to be welded together a sufficiently large gas space to permit a welder-diver to weld.

If desired, the chamber may have fume extraction means to remove fume emitted by the flux-cored wire.

The invention includes within its scope pipelines repaired by the method according to the present invention, and oil or gas or other fluid which is passed through a pipeline repaired by the method according to the present invention.

In some instances the length of the pipeline needing to be cut away may be so short that no length of replacement pipe will be needed. In such instances the principle of employing a sleeve, so as to be able to cater for any variation in the diameter of the pipeline within the range of diameters specified for it, may also be applied.

Accordingly the present invention also provides a method of repairing an under water pipeline from which a defective or damaged length of pipe has been cut away to form two longitudinally spaced-apart, exposed, pipe ends which method includes the steps of:

(i) butt-welding to one exposed pipe end a tubular end portion of a first hollow, open-ended member having an inner or outer part-spherical mating surface;

(ii) butt-welding a sleeve to the other exposed pipe end;

(iii) mounting on the sleeve a tubular end portion of a second hollow open-ended member which has a part-spherical mating surface complementary to that of the first open-ended member; and (iv) fillet welding the sleeve to the tubular end portion of the second open-ended member, and the mating surfaces of the open-ended member to each other;

Wherein the sleeve and the tubular portions of the open-ended members have internal diameters and radial wall thickness such that the butt-welds are able to be made irrespective of where in the range of external diameters specified for the pipeline the actual external diameters of the pipeline lies.

The welds may be made under water in a gaseous atmosphere and choice of dimensions for the sleeve and the open-ended members may be made analogously, to when a length of replacement pipe is required.

The invention will now be described by way of example with reference to the accompanying drawings of which:

FIGS. 1 to 5 are schematic representations of a pipeline at different stages of an operation to repair it.

Figure 2:
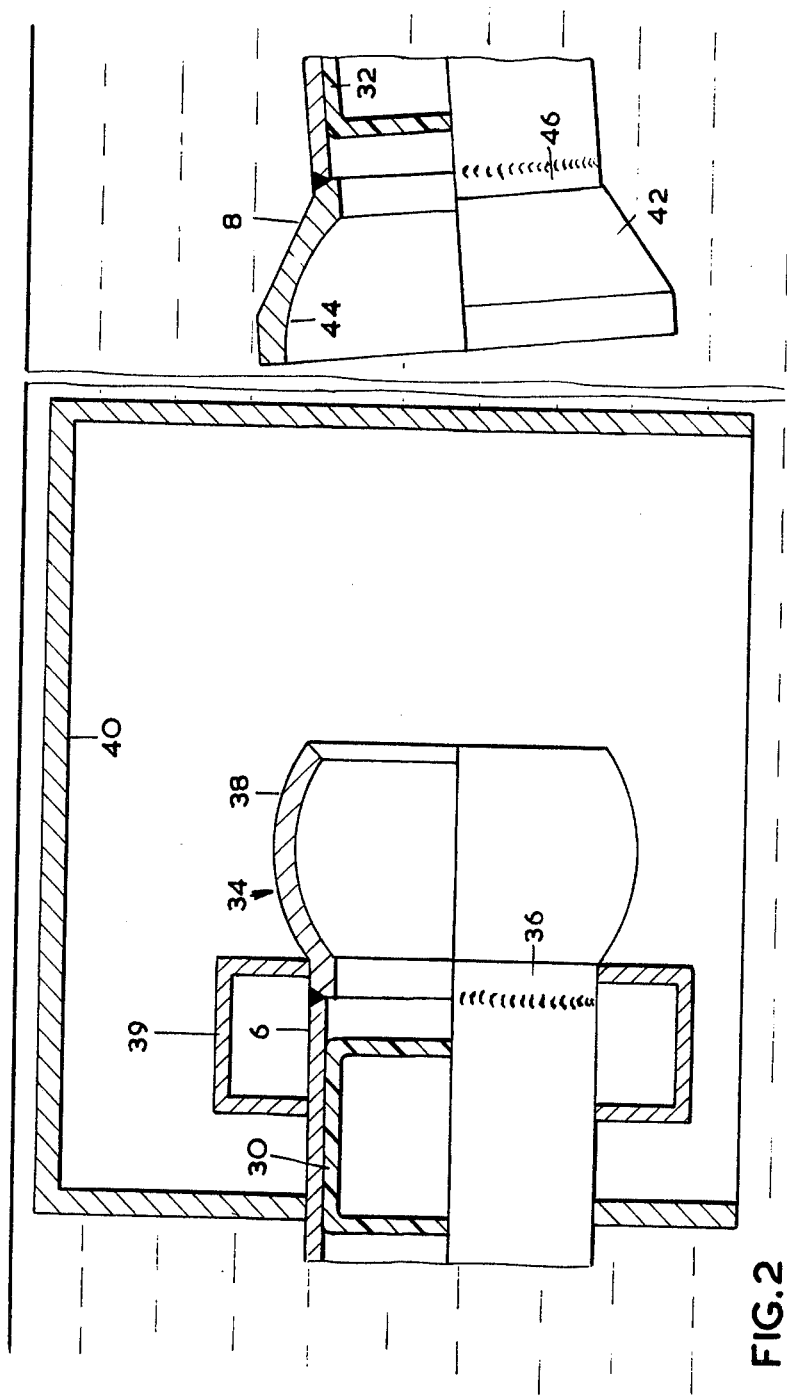
Figure 6:
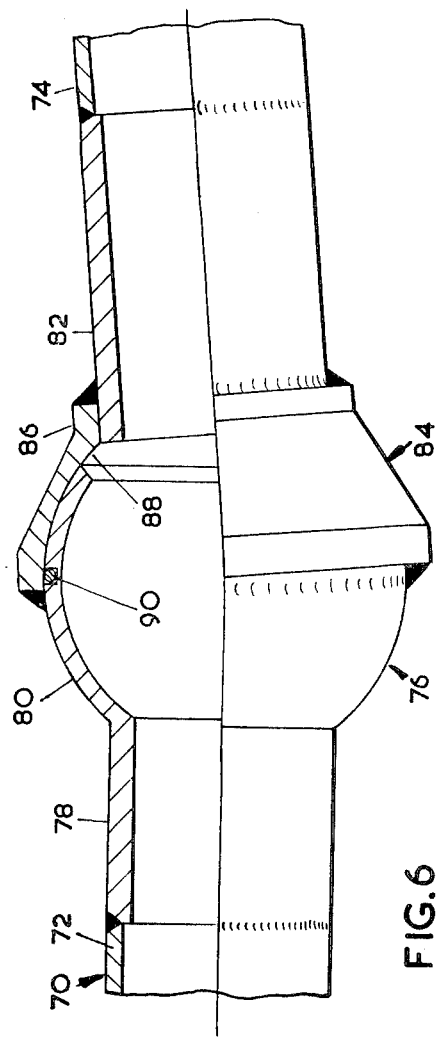

FIG. 6 is a schematic representation of a pipeline after it has been repaired by a method not using a length of replacement pipe in addition to a sleeve and the hollow members Thus, pipeline ends 6 and 8 are exposed, as shown in FIG. 2. It is necessary for these ends not to be deformed. If, for example, it is found that the exposed ends are oval it will be necessary to cut further lengths of pipeline away.

When the damaged section of pipeline has been cut away the welder-diver measures the distance between the exposed ends C and 8 of the pipeline. Having regard to this distance, a suitable length of replacement pipe 10 (see FIG. 3) is cut from a spool of pipe (not shown) on a support vessel above the damaged region of pipeline. The ends of the pipe 10 are then cleaned and bevelled in order to prepare them for butt-welding. A prefabricated sleeve 12 of known and suitable dimension having one of its ends suitably bevelled such that when placed in abutment with one end of the pipe 10 it defines a groove of V-shaped cross-section is then butt-welded to the chosen end of pipe 10 by any suitable arc welding method for welding together lengths of pipe. A conventional internal or external pipe alignment frame may be used to clamp the sleeve 12 to the pipe 10 prior to welding as the configuration of the V preparation may be such that an internal or external butt-weld may be made. Preferably an external butt-weld is made.

The next step is to weld to the other end of the pipe 10 an open-ended (or socket) member 14 having an internal part-spherical mating surface 16 and a tubular end portion 18. The end of the portion is bevelled so as to define an internal groove of V-shaped cross-section with the bevelled edge of the pipe 10. The socket member 14 is then internally butt welded to the end of the pipe 10 by means of an arc-welding technique, a conventional external pipe alignment frame being used to clamp the socket member 14 to the pipe 10 prior to welding. If desired the groove may be located externally of the socket member 14 and pipe 10 and a conventional internal pipe alignment frame used to clamp these parts together prior to welding.

Inflatable backstops 20 and 22 (or 'pigs') are then inserted in the sleeve 12 and the end of pipe 10 opposite the sleeve 12. The pigs 20 and 22 are then inflated and thereby sealingly engage the internal walls of the sleeve 12 and the pipe 10.

An open-ended (or ball) member 24 having an external part-spherical mating surface 26 and a tubular end portion 28 is then slid onto the sleeve 12. The combined length of the socket member 14, the replacement pipe 10 and the sleeve 12 is such that with the ball member slid back to a position in which the end of portion 28 lies around the weld between the pipe 10 and sleeve 12 the replacement assembly is able to be positioned between the exposed ends 6 and 8 of the pipeline when these ends have their open-ended members welded to them.

While the replacement pipe is being prepared open-ended members may be welded to the exposed ends 6 and 8 of the pipeline 2. First, the ends 6 and 8 are stripped of bituminous protective material which is used to prevent corrosion of the pipe. Then the faces of the ends 6 and 8 are bevelled by machining so as to form grooves of V-shaped cross-section with the end faces of the tubular end portions of open-ended members to be welded thereto. When the ends 6 and 8 of the pipeline 2 have been prepared for welding inflatable backstops (or 'pigs') 30 and 32 may be inserted therein and inflated so as to engage in a fluid-tight manner the inner wall of the pipeline 2. An open-ended (or ball) member 34 having an outer part-spherical mating surface complementary to that of the socket member 14 is then clamped by means of clamp (or alignment frame) 39 to the end 6 of the pipeline 2 such that the tubular end portion 36 of the ball member 34 is held in abutment with the end 6, the bevelled faces of the end portion 36 and end 6 defining a groove of V-shaped cross-section, the mouth of the V being preferably located outwards (as shown) rather than inwards. An open-based 'DriWeld' chamber 40 (DriWeld is a trade mark) is then assembled around the end 6 and ball member 34 and a gaseous welding space created therearound. One side opening in the chamber 40 for a pipe may be sealed by e.g. a cap as the members to be welded will not extend through both openings at this stage of the repair. Alternatively, a 'DriWeld' chamber with only one opening to receive a pipe may be used. Since the sea around the pipeline 2 acts as a heat 'sink' it may be necessary to preheat the region of the weld before commencing to weld. Gas is passed from above water into the 'DriWeld' chamber 40 so as to create a gas space therein by displacing water out of the open base of the chamber. Then, if required, pre-heat mats (i.e. mats that have embedded therein electrical heaters, which heaters are adapted to be connected in electrical circuits with an above-water electrical power source) are wrapped around the end 6 and the end portion 38 of ball member 34 and are energised so as to heat the end 6 and ball member 34 to a temperature defined by the thickness and geometry of the welded joint, the arc energy of the welding process, and the chemical nature of the steel. Such preheat temperature are generally defined by well known standards. Once the end 6 and ball member 34 have been adequately pre-heated a butt-weld therebetween can be made. It is to be noted that this weld is illustrated as being an external weld. It is possible though not preferred for this butt weld to be internal. The welder-diver inserts the top of the welding torch into the 'V' and commences to weld. The method of welding used is preferably a GMA welding method using a flux-cored wire. The welding wire is preferably of the self-shielding type (e.g. Innershield (RTM) 203M) and is preferably used in conjunction with a shielding gas, typically consisting of 98% by volume of argon and 2% by volume of oxygen. If, internal butt welds are to be made this is facilitated by making the ball-and-socket members of no more than a foot in length. As the method according to the present invention is generally suitable for welding pipes of wider diameter (e.g. 2 ft or more) the welder-diver has plenty of room to insert his arm into the ball or socket member and will have to reach no more than 1 ft in order to make the weld. It is nonetheless desirable for the 'Driweld' chamber to have a volume sufficiently large for the welder-diver to be able to work entirely within the chamber. If desired a platform for the welder diver may be built to the chamber. However, each butt-weld is preferably prepared with a groove of 'V'-shaped cross-section, of which the mouth of the V is externally situated. External clamps are preferably used. Each such clamp may be a toggle clamp such that it does not obstruct the making of the butt-welds.

Figure 3:
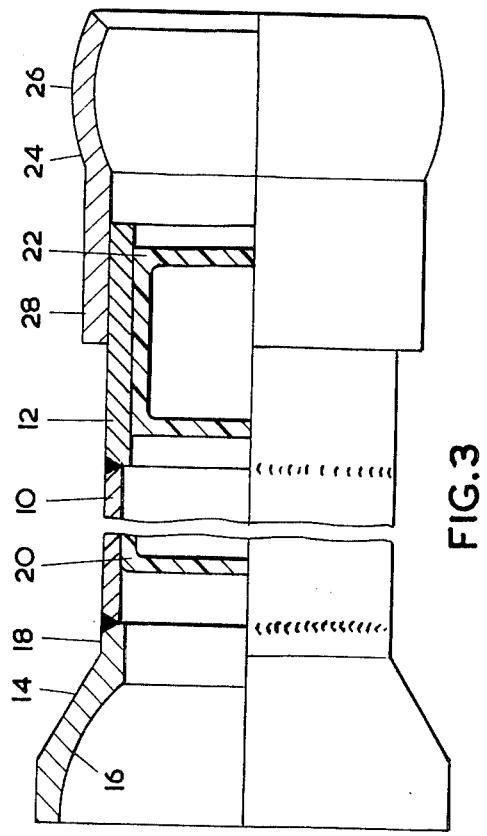
Figure 4:
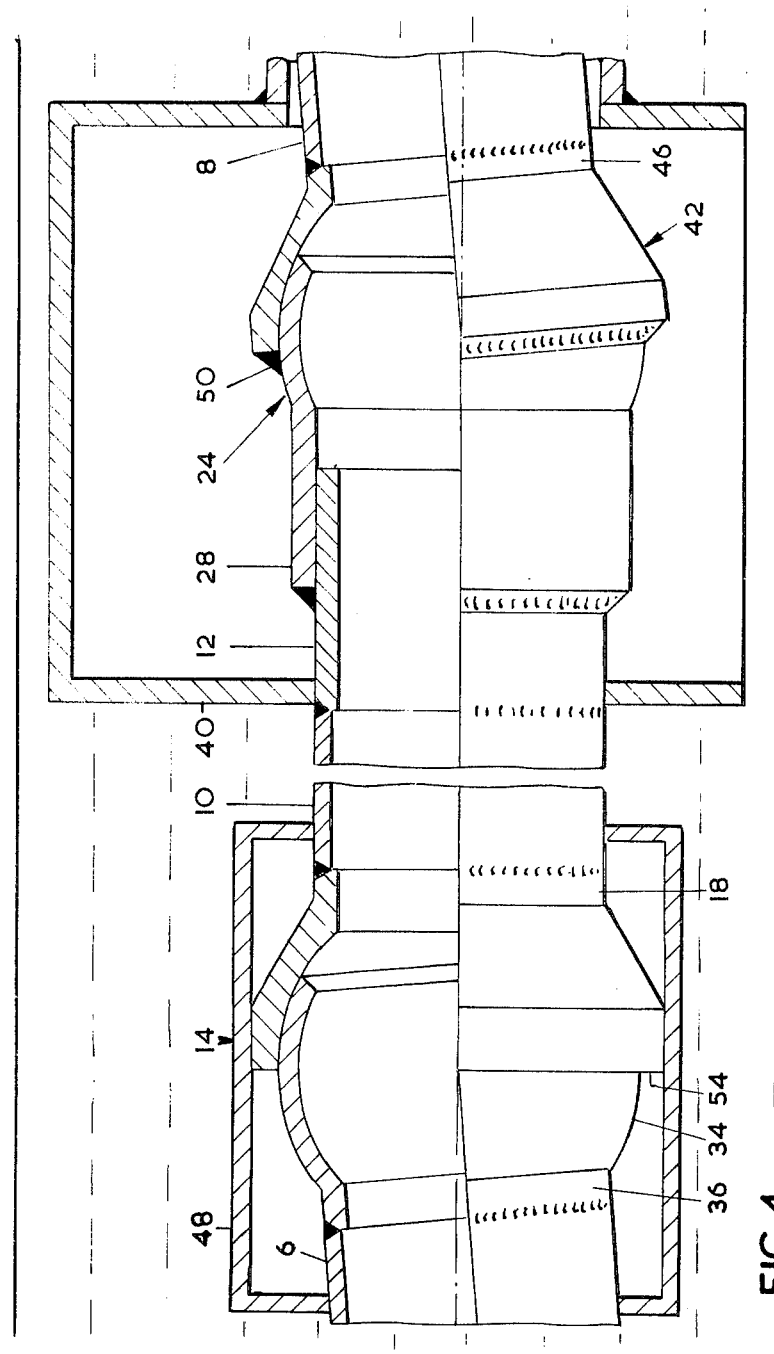

An analogous procedure to that described above may be used to weld to the end 8 a socket member 42 having an inner part spherical mating surface 44 complementary to that of the ball member 24 and a tubular end portion 46. If desired the same clamps, preheat mats and the Driweld chamber described above may be used in making this weld. When the ball member 34 and socket member 42 having been welded to the respective ends 6 and 8 of the pipeline 2 the replacement pipe assembly, as shown in FIG. 3, may be lowered into position. Before the replacement assembly is so lowered the sliding ball member 24 may be clamped into a position in which the longitudinal distance between the ball and socket ends of the members 24 and 14 on the replacement assembly is less than that between the ball and socket ends of the members 34 and 42 welded to the exposed ends 6 and 8 of the pipeline 2. When the replacement assembly is in position the socket member 14 is mated with the ball member 34 to form a ball-and-socket coupling. The members 14 and 34 are then clamped in this position in which it mates with the socket member 42 to form a ball-and-socket coupling. The DriWeld chamber 40 is then positioned around this coupling, a gaseous space created in the chamber 40, the sleeve 12, ball member 24 and socket member 42 preheated, if required, and then the end 50 of the socket member 42 fillet welded to the part spherical outer surface 26 of the ball member 24, and the end 52 of the tubular portion 28 fillet welded to the outer surface of the sleeve 12.

Once sufficient time has been allowed for the area of the weld to have cooled to an acceptable temperature gas may be released from the Driweld chamber 40, the chamber passed along the replacement pipe 10 and positioned around the ball-and-socket member 14. The gas space is then recreated in the chamber 40. the clamp 48 is removed, the overlapping portions of the ball member 34 and the socket member 14 preheated, if required, and the end 54 of the socket member 14 fillet welded to the outer spherical surface 26 of the ball member 24. When sufficient time has been allowed for the area of the weld to have cooled to an acceptable temperature gas may be released from the Driweld chamber 40, the chamber disassembled, any trestles used to support and lift from the ocean bed the ends 6 and 8 of the pipeline 2 and the replacement pipe 10 removed and the repaired section of the pipe relaid on the ocean bed with, if desired, a bituminous protective or other coating or alternative corrosion protection means, e.g. cathodic means.

Figure 5:
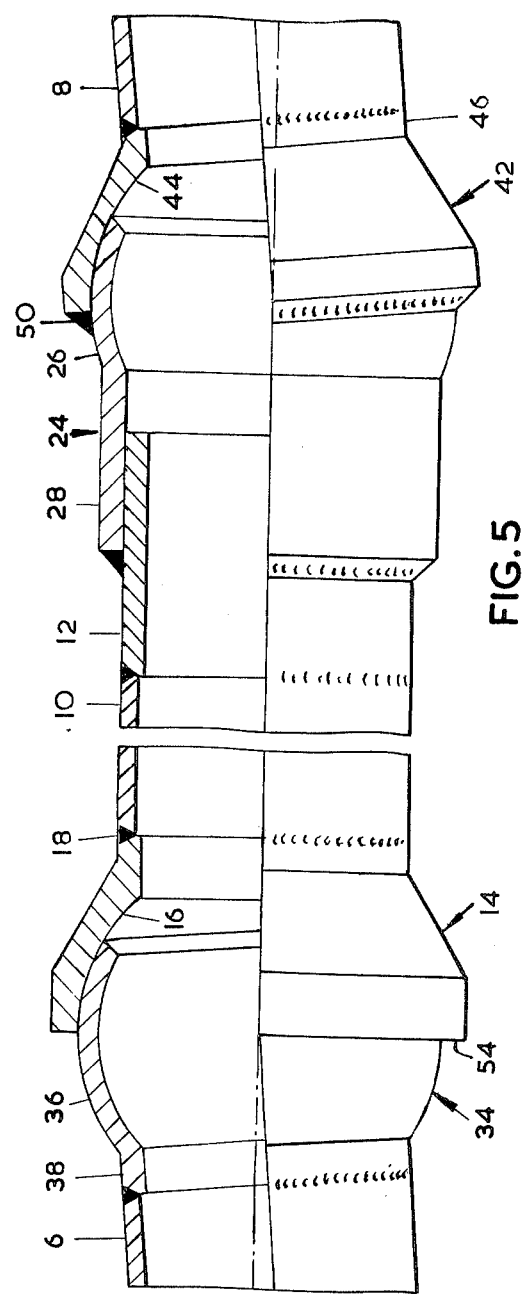

The repaired length of the pipe line is shown in FIG. 5. It is to be appreciated that once fluid is passed again through the repaired pipeline the backstops or pigs will be forced by the fluid pressure out of the pipeline and hence these are not shown in FIG. 5. They are also for the sake of clarity omitted from FIG. 4.

In repairing the pipeline it is desirable that the replacement pipe 10, the sleeve 12 and the ball and socket member be all of a steel having physical and mechanical properties as close as possible to that of the steel from which the pipeline 2 is fabricated.

Before the sleeve 12 and the ball and socket members 14, 24, and 34 and 42 are fabricated and a suitable spool of pipe from which the replacement pipe 10 is chosen a knowledge of the dimensions of the lengths of pipe that go to make up the pipeline 2 is required. The type of pipe that is used will normally have a British standard or other specification which will quote a figure for the external diameter of the pipe and the tolerance associated with the diameter. The radial wall thickness of the pipe will also generally be quoted. For example, the pipe may have an external nominal diameter of 3ft ∓ 1% and a radial wall thickness of say, half an inch. Knowing the specification of the pipe a spool of pipe fabricated to the same (or equivalent) specification may be chosen to provide the length of replacement pipe 10. The radial wall thicknesses of the tubular end portions of the ball and socket members 14, 42 and 34 are chosen so as to be capable of being butt welded to, respectively, ends 6 and 8 of the pipeline 2 and the left hand end (as shown) of the replacement pipe 10 irrespective of what are the external diameters of the pipeline 2 and pipe 10 within the specified range. Thus, the radial wall thickness of the tubular end portions of the members 14, 42 and 34 should be such that these end portions are capable of being adequately butt welded even if the internal diameter of the pipeline 2 and probably of the replacement pipe 10 is the minimum of 34.64 inches and/or if the external diameter is the maximum of 36.36 inches. In consequence a radial wall thickness equal to half the difference between these two figures (i.e. 0.86 inches) will always be adequate, although in practice it is possible to use a nominally lower or greater radial wall thickness. If the wall thickness is such that there is too large a step between the surfaces to be welded for a successful butt weld to be made the excess thickness of the sleeve may be removed by machining. Exactly the same factors govern the choice of the radial wall thickness of the sleeve 12 which may therefore be 0.86 inches. Moreover, as the ball member 24 will be cast in the same mould as that used for casting the ball member 34 it will have the same dimensions as the ball member 34.

The ball and socket members are desirably all cast, forged and/or machined, precisely, such that the part spherical mating surface of each ball member makes a precise fit with the part spherical mating surface of each socket member. Analogously the sleeve 12 may be cast, forged, moulded or machined precisely such that its external surface makes a precise fit with the internal surface of the tubular end member of the ball member 24.

An alternative design philosophy which in most instances will reduce the work in machining the parts to be welded that is required to be done by the welder-diver is to make the sleeve and tubular parts of the ball and socket members to the nominal external (or internal) diameter.

It will generally be desirable for these parts to have a greater radial wall thickness than that of the pipeline for them to withstand the pressure to which they will be subjected to during operation of the pipeline when repaired. It is not necessary for the surfaces that are to be butt welded to be in strict alignment with each other. On the contrary, a small step of one between the two parts may be tolerated. It is conceivable that the external diameter of the pipe may be almost at one end of the range specified for it, at that consequently it may in some instances be necessary to build up the wall thickness of the member to be welded thereto by depositing weld metal on its external surface before making other preparations for the weld.

It is to be appreciated that in FIGS. 1 to 5 of the drawings the welding chambers and clamps are illustrated only schematically and details of their construction are not shown. Suitable clamps and welding chambers are well known in the art.

Referring to FIG. 6 of the drawings, a pipeline 70 has a damaged section cut away leaving two exposed pipe ends 72 and 74. Inflatable 'pigs' (not shown) are inserted in these ends and inflated. The pipe ends 72 and 74 are prepared for external butt-welding. The end 72 has butt welded to it the tubular end 78 of a hollow open ended coupling member 76 having at its other end an external part-spherical mating surface 80.

The pipe end 74 has a sleeve 82 butt-welded to it. On the other end of the sleeve is mounted the tubular end 86 of a hollow open-ended coupling member 84 having an internal part-spherical mating surface 88 complementary to the mating surface 80 of the coupling member 76. The length of the coupling cut away is such that by using a sleeve and coupling members of predetermined length it is possible to effect the repair. Thus, the mating surface 88 of the coupling member 84 should be able to be mated with the mating surface 80 of the coupling member 76 to form a ball-and-socket coupling without the coupling member being pulled off the sleeve 82. The coupling member 84 may then be clamped in position and fillet welds made first between the sleeve 82 and the tubular end 86 of the coupling member 84 and then between the mating surfaces 80 and 88 of the coupling members 76 and 84. If desired, the mating surfaces 80 and 88 may be fitted with an 'O'-ring 90 of elastomeric material befure they are welded together.

The radial wall thickness of the sleeve 82 and the coupling members 76 and 84 are chosen to be greater than that of the pipeline 70 in accordance with the method according to the present invention.

The welds are all made under water in a manner analogous to that previously described with reference to FIGS. 1 to 5 for making under water welds.

What we claim is:

1. A method of repairing an under water pipeline from which a defective or damaged length of pipe has been cut away to form two longitudinally spaced-apart, exposed, pipe ends which method includes the steps of:
   (a) butt-welding to each exposed pipe end a tubular end portion of a hollow, open-ended member having an inner or outer part-spherical mating surface;
   (b) butt-welding a sleeve to one end of a length of replacement pipe;
   (c) mounting on the sleeve a tubular end portion of a hollow open-ended member which has a part-spherical mating surface complementary to that of one of the open-ended members butt-welded to the exposed pipe ends and which is adapted to form therewith a ball-and-socket coupling;

(d) welding to the other end of the replacement pipe a tubular end portion of a hollow open-ended member which has a part-spherical mating surface complementary to that of the other of the members butt-welded to the exposed pipe ends and which is adapted to form therewith a ball-and-socket coupling;

(e) positioning the replacement pipe between the exposed pipe ends and mating the respective pairs of open-ended members; and (f) fillet welding the sleeve to the tubular end portion of the open-ended member mounted thereupon and fillet welding the mating open-ended members to each other;

Wherein the sleeve and the tubular end portions of the open-ended members to be butt welded each have an internal diameter and radial wall thickness so as to be capable of being butt-welded to the end of the pipe or pipeline (as the case may be) to be joined thereto irrespective where in the range of external diameters specified for the pipe and pipeline the external diameters of the pipe and pipeline lie.

2. A method as claimed in claim 1, in which the tubular end portion of the end member to be welded to the said other end of the replacement pipe is butt-welded thereto.

3. A method as claimed in claim 2, in which the open-ended members to be welded to the exposed ends of the pipeline have respectively internal and external part mating surfaces.

4. A method as claimed in claim 3, in which the open-ended member to be welded to the sleeve has an external part-spherical mating surface.

5. A method as claimed in claim 1, in which between each pair of mating open-ended member is engaged a sealing ring.

6. A method as claimed in claim 1, in which steps (b), (c) and (d) are performed above the surface of the water, and in which the welds involved in steps (a) and (f) are performed under water in a welding chamber containing a gaseous atmosphere.

7. A method as claimed in claim 1, in which all the butt welds are external.

8. A method of repairing an under water pipeline from which a defective or damaged length of pipe has been cut away to form two longitudinally spaced-apart, exposed, pipe ends which method includes the steps of:

(a) butt-welding to one exposed pipe end a tubular end portion end portion of a first hollow, open-ended member having an inner or outer part-spherical mating surface;

(b) butt-welding a sleeve to the other exposed pipe end;

(c) mounting on the sleeve a tubular end portion of a second hollow open-ended member which has a part-spherical mating surface complementary to that of the first open-ended member; and (d) fillet welding the sleeve to the tubular end portion of the second open-ended member, and the mating surfaces of the open-ended member to each other;

Wherein the sleeve and the tubular portions of the open-ended members have internal diameters and radial wall thickness such that the butt welds are able to be made irrespective of where in the range of external diameters specified for the pipeline the actual external diameters of the pipeline lies.

* * * * *